(12) United States Patent
Agrawal et al.

(10) Patent No.: US 8,909,633 B2
(45) Date of Patent: Dec. 9, 2014

(54) METHOD AND SYSTEM FOR IMPROVING RELEVANCE OF WEB CONTENT

(75) Inventors: Ashvin Agrawal, Bangalore (IN); Ankit Sobti, Bangalore (IN); Arup Malakar, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 312 days.

(21) Appl. No.: 13/174,796

(22) Filed: Jul. 1, 2011

(65) Prior Publication Data

US 2013/0006977 A1    Jan. 3, 2013

(51) Int. Cl.
*G06F 17/30* (2006.01)

(52) U.S. Cl.
CPC .............................. *G06F 17/30867* (2013.01)
USPC ........................................................ 707/728

(58) Field of Classification Search
CPC ................. G06F 17/30528; G06F 17/30867; G06F 17/30646
USPC .......... 707/728, 722, 751, 748, 749, 723, 758
See application file for complete search history.

(56) References Cited

U.S. PATENT DOCUMENTS

| | | | | |
|---|---|---|---|---|
| 7,788,260 B2 * | 8/2010 | Lunt et al. | | 707/727 |
| 8,271,483 B2 * | 9/2012 | Staddon et al. | | 707/730 |
| 2008/0189272 A1 * | 8/2008 | Powers et al. | | 707/5 |
| 2009/0125511 A1 * | 5/2009 | Kumar | | 707/5 |
| 2009/0164929 A1 * | 6/2009 | Chen et al. | | 715/769 |
| 2009/0216752 A1 * | 8/2009 | Terui et al. | | 707/5 |
| 2009/0299824 A1 * | 12/2009 | Barnes, Jr. | | 705/10 |
| 2010/0082604 A1 * | 4/2010 | Gutt et al. | | 707/721 |
| 2010/0205131 A1 * | 8/2010 | Kumar et al. | | 706/46 |
| 2011/0202533 A1 * | 8/2011 | Wang et al. | | 707/738 |

* cited by examiner

*Primary Examiner* — Hung T Vy
(74) *Attorney, Agent, or Firm* — James J. DeCarlo; Greenberg Traurig, LLP

(57) ABSTRACT

A method and system for improving relevance of web content. The method includes receiving a search query from a user. The method also includes processing the search query by generating a list of web content results based on the search query. The search query is also processed by determining a plurality of click counts for the list of web content results. Each click count of the plurality of click counts is generated by one or more contacts in a social network of the user. The search query is further processed by mapping each click count to a corresponding web content result in the list of web content results. The method further includes displaying the list of web content results along with the plurality of click counts. Each click count of the plurality of click counts is displayed with the corresponding web content result in the list of web content results.

18 Claims, 3 Drawing Sheets

METHOD AND SYSTEM FOR IMPROVING RELEVANCE OF WEB CONTENT

TECHNICAL FIELD

Embodiments of the disclosure relate to the field of improving relevance of web content.

BACKGROUND

Web content results, for example search results, search suggestions, links, and advertisements, are generally displayed based on content relevance, demographical differences, and user location. Such web content results are often not relevant to most users. Moreover, the web content results that are relevant are usually not displayed at top of the web content results, thereby not meeting desired requirements of the users. Search algorithms currently generate and rank the web content results based on the content relevance to a search query of a user or based on profile of the user. Further, the search queries are at times incorrect or incomplete, thereby not leading to intended web content results.

In the light of the foregoing discussion, there is a need for a method and system for an efficient technique to improve relevance of web content and search queries.

SUMMARY

The above-mentioned needs are met by a method, a computer program product and a system for improving relevance of web content.

An example of a method of improving relevance of web content includes receiving a search query from a user. The method also includes processing the search query by generating a list of web content results based on the search query. The method further includes determining a plurality of click counts for the list of web content results. Each click count of the plurality of click counts is generated by one or more contacts in a social network of the user. Further, the method includes mapping each click count to a corresponding web content result in the list of web content results. Moreover, the method includes displaying the list of web content results along with the plurality of click counts. Each click count of the plurality of click counts is displayed with the corresponding web content result in the list of web content results.

An example of a computer program product stored on a non-transitory computer-readable medium that when executed by a processor, performs a method of improving relevance of web content includes receiving a search query from a user. The computer program product also includes processing the search query by generating a list of web content results based on the search query. The computer program product further includes determining a plurality of click counts for the list of web content results. Each click count of the plurality of click counts is generated by one or more contacts in a social network of the user. Further, the computer program product includes mapping each click count to a corresponding web content result in the list of web content results. Moreover, the computer program product includes displaying the list of web content results along with the plurality of click counts. Each click count of the plurality of click counts is displayed with the corresponding web content result in the list of web content results.

An example of a system for improving relevance of web content includes one or more electronic devices. The system also includes a communication interface in electronic communication with the one or more electronic devices. The system further includes a memory that stores instructions. Further, the system includes a processor responsive to the instructions to receive a search query from a user. The processor is also responsive to the instructions to process the search query by generating a list of web content results based on the search query. The processor is further responsive to the instructions to determine a plurality of click counts for the list of web content results, each click count of the plurality of click counts being generated by one or more contacts in a social network of the user. Further, the processor is responsive to the instructions to map each click count to a corresponding web content result in the list of web content results. Moreover, the processor is responsive to the instructions to display the list of web content results along with the plurality of click counts, each click count of the plurality of click counts being displayed with the corresponding web content result in the list of web content results.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

The above-mentioned needs are met by a method, computer program product and system for improving relevance of web content. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
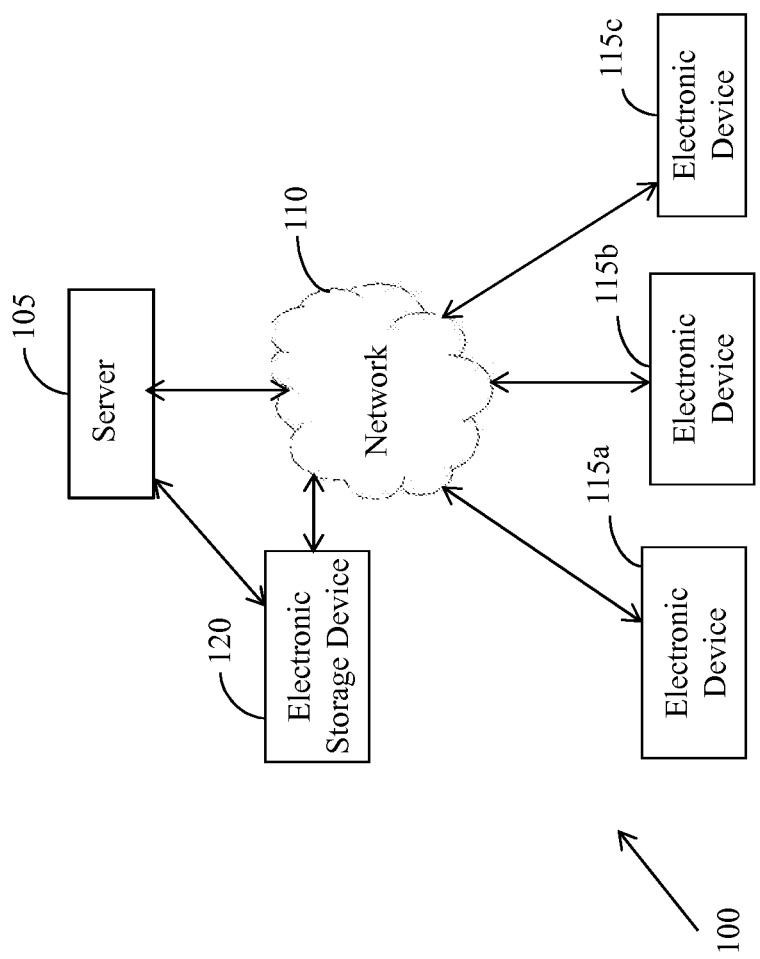
FIG. 1 is a block diagram of an environment, in accordance with which various embodiments can be implemented.

FIG. 1 is a block diagram of an environment 100, in accordance with which various embodiments can be implemented.

The environment 100 includes a server 105 connected to a network 110. The environment 100 further includes one or more electronic devices, for example an electronic device 115a, an electronic device 115b and an electronic device 115c, which can communicate with each other through the network 110. Examples of the electronic devices include, but are not limited to, computers, mobile devices, laptops, palmtops, hand held devices, telecommunication devices, and personal digital assistants (PDAs).

The electronic devices can also communicate with the server 105 through the network 110. Examples of the network 110 include, but are not limited to, a Local Area Network (LAN), a Wireless Local Area Network (WLAN), a Wide Area Network (WAN), internet, and a Small Area Network (SAN). The electronic devices associated with different users can be remotely located with respect to the server 105.

The server 105 is also connected to an electronic storage device 120 directly or via the network 110 to store information, for example a list of web content results.

In some embodiments, different electronic storage devices are used for storing the information.

A user of an electronic device, for example the electronic device 115a, can access a web search engine, for example Yahoo!® Search, on a web page via the electronic device 115a. The user enters a search query, via the network 110, through the web search engine and the search query is processed by the server 105, for example the Yahoo!® server. The server 105 generates the list of web content results along with a plurality of click counts, which is further displayed to the user. The user can then select a web content result based on an associated click count.

Figure 2:
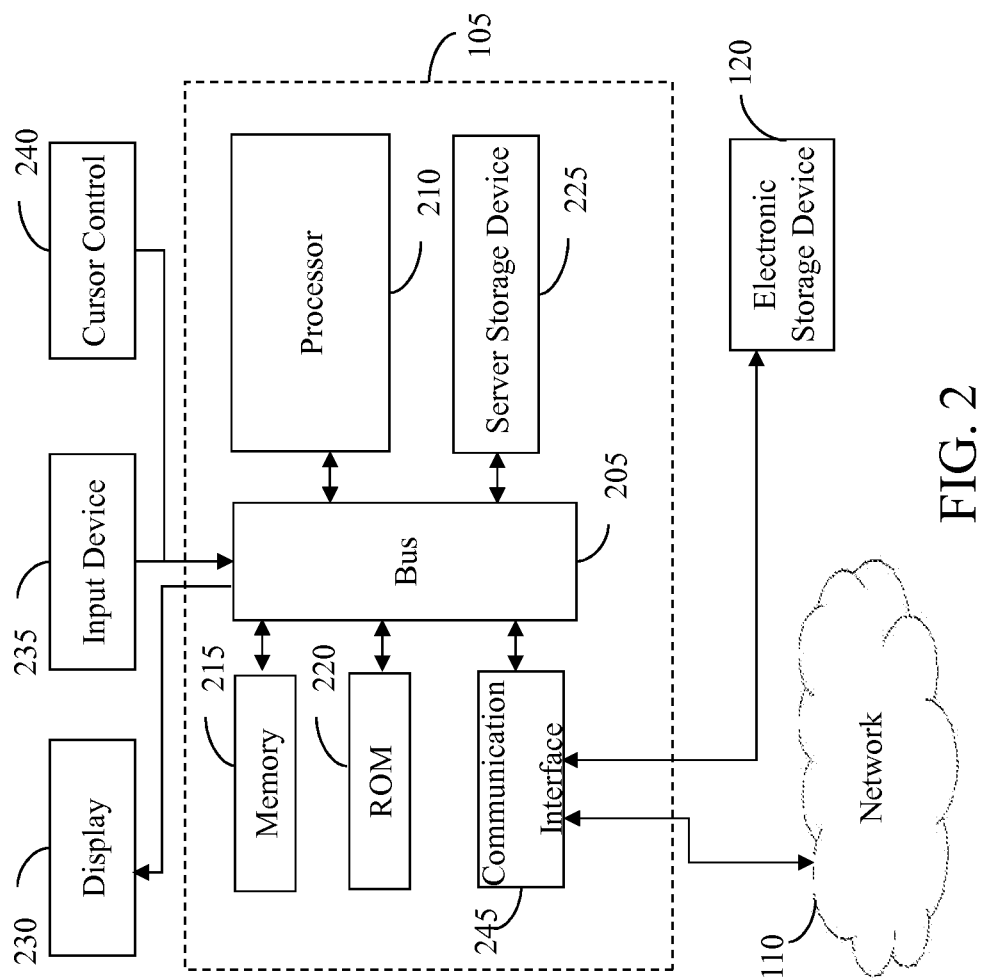
FIG. 2 is a block diagram of a server, in accordance with one embodiment.

The server 105 including a plurality of elements is explained in detail in conjunction with FIG. 2.

FIG. 2 is a block diagram of the server 105, in accordance with one embodiment.

The server 105 includes a bus 205 or other communication mechanism for communicating information, and a processor 210 coupled with the bus 205 for processing information. The server 105 also includes a memory 215, for example a random access memory (RAM) or other dynamic storage device, coupled to the bus 205 for storing information and instructions to be executed by the processor 210. The memory 215 can be used for storing temporary variables or other intermediate information during execution of instructions by the processor 210. The server 105 further includes a read only memory (ROM) 220 or other static storage device coupled to the bus 205 for storing static information and instructions for the processor 210. A server storage device 225, for example a magnetic disk or optical disk, is provided and coupled to the bus 205 for storing information, for example information associated with a first plurality of search queries, and a second plurality of search queries.

The server 105 can be coupled via the bus 205 to a display 230, for example a cathode ray tube (CRT), and liquid crystal display (LCD) for displaying web advertisements to the user. An input device 235, including alphanumeric and other keys, is coupled to bus 205 for communicating information and command selections to the processor 210. Another type of user input device is a cursor control 240, for example a mouse, a trackball, or cursor direction keys for communicating direction information and command selections to the processor 210 and for controlling cursor movement on the display 230. The input device 235 can also be included in the display 230, for example a touch screen.

Various embodiments are related to the use of server 105 for implementing the techniques described herein. In some embodiments, the techniques are performed by the server 105 in response to the processor 210 executing instructions included in the memory 215. Such instructions can be read into the memory 215 from another machine-readable medium, for example the server storage device 225. Execution of the instructions included in the memory 215 causes the processor 210 to perform the process steps described herein.

In some embodiments, the processor 210 can include one or more processing units for performing one or more functions of the processor 210. The processing units are hardware circuitry used in place of or in combination with software instructions to perform specified functions.

The term "machine-readable medium" as used herein refers to any medium that participates in providing data that causes a machine to perform a specific function. In an embodiment implemented using the server 105, various machine-readable media are involved, for example, in providing instructions to the processor 210 for execution. The machine-readable medium can be a storage medium, either volatile or non-volatile. A volatile medium includes, for example, dynamic memory, such as the memory 215. A non-volatile medium includes, for example, optical or magnetic disks, for example the server storage device 225. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punchcards, papertape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that comprise the bus 205. Transmission media can also take the form of acoustic or light waves, such as those generated during radio-wave and infra-red data communications. Examples of machine-readable media may include, but are not limited to, a carrier wave as described hereinafter or any other media from which the server 105 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the server 105 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the server storage device 225 either before or after execution by the processor 210. All such media must be tangible to enable the instructions carried by the media to be detected by a physical mechanism that reads the instructions into a machine.

The server 105 also includes a communication interface 245 coupled to the bus 205. The communication interface 245 provides a two-way data communication coupling to the network 110. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN. Wireless links can also be implemented. In any such implementation, the communication interface 245 sends and receives electrical, electromagnetic or optical signals that carry digital data streams representing various types of information.

The server 105 is also connected to the electronic storage device 120 to store the list of web content results.

In some embodiments, the server 105, for example a Yahoo!® server, receives a search query from a user. The server 105 then processes the search query by generating a list of web content results based on the search query, by determining a plurality of click counts for the list of web content results, and by mapping each click count to a corresponding web content result in the list of web content results. The server 105 then displays the list of web content results along with the plurality of click counts to the user.

In some embodiments, the processor 210 in the server 105 can include a first processor (not shown) and a second processor (not shown). The first processor can be responsive to the instructions to receive the search query from the user, and process the search query by generating the list of web content results based on the search query. The second processor can be responsive to the instructions to determine a plurality of click counts for the list of web content results, map each click count to a corresponding web content result in the list of web content results, and display the list of web content results along with the plurality of click counts to the user.

Figure 3:
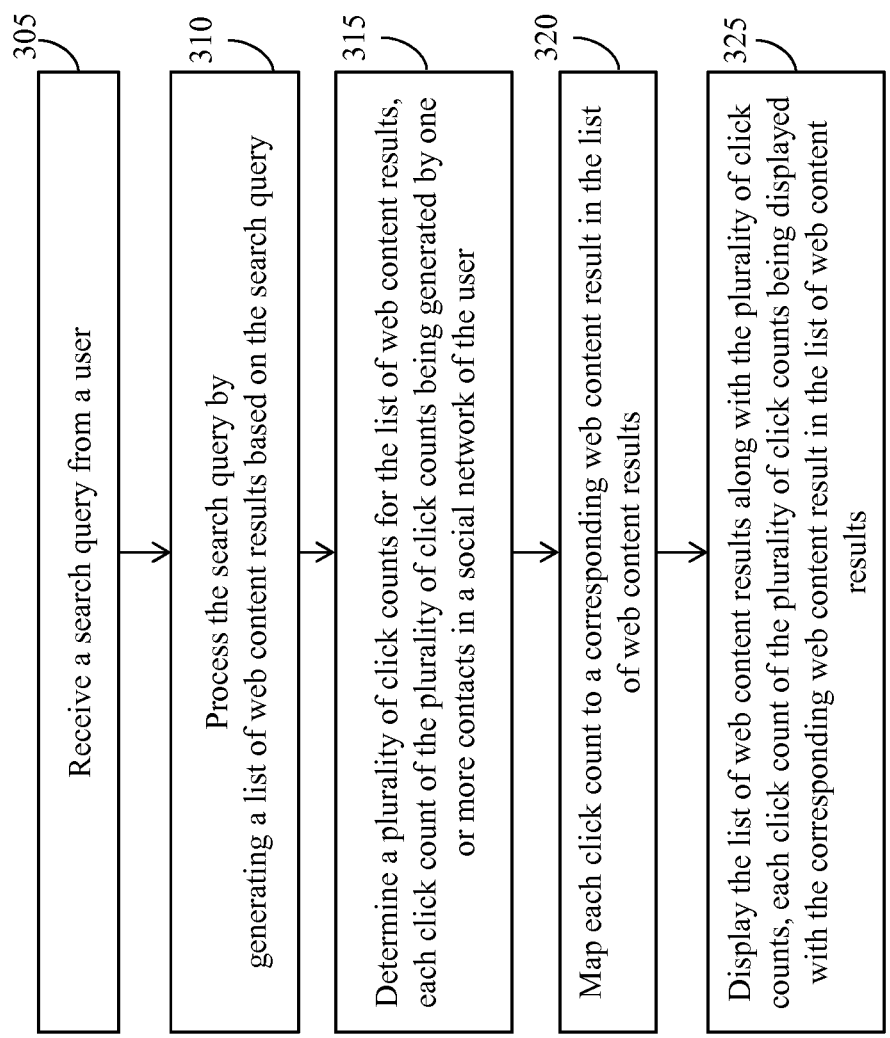
FIG. 3 is a flowchart illustrating a method of improving relevance of web content, in accordance with one embodiment.

FIG. 3 is a flowchart illustrating a method of improving relevance of web content, in accordance with one embodiment.

At step 305, a search query is received from a user. The user enters the search query from a web browser using a web search engine, for example Yahoo!® Search, on an electronic device, for example the electronic device 115a. In some embodiments, the search query can be sent from a script or by using a command. The search query is received by a server, for example the server 105. In one example, the server can be a content server of Yahoo!®.

When the user enters the search query, a second plurality of search queries can be provided to the user. The second plurality of search queries is similar to the search query entered by the user and is mined from a first plurality of search queries. The first plurality of search queries is created by one or more contacts in a social network of the user. The first plurality of search queries is further stored by the server.

At step 310, the search query is processed. A list of web content results based on the search query is generated using a search algorithm. The list of web content results is also ranked using the search algorithm.

At step 315, a plurality of click counts is determined for the list of web content results. Each click count is generated by the one or more contacts in the social network of the user.

In some embodiments, only a subset of the click counts is determined for the list of web content results.

At step 320, each click count is mapped to a corresponding web content result in the list of web content results.

In some embodiments, only the subset of the click counts is mapped to corresponding subset of the list of web content results.

In some embodiments, the list of web content results includes one or more of search results, search suggestions, links and advertisements.

A click count can be defined as number of times a search result, a search suggestion, a link, or an advertisement was clicked by the one or more contacts in the social network of the user. A higher click count indicates a higher relevance of the search result, the search suggestion, the link, or the advertisement.

In some embodiments, the click count can be used to re-arrange or filter the list of web content results.

At step 325, the list of web content results is displayed along with the click counts in a predefined order. Each click count is displayed with the corresponding web content result in the list of web content results. The list of web content results is displayed in the web browser or in an application.

In some embodiments, due to an increased amount of web content results, the subset of the list of web content results is displayed along with the subset of the click counts in a first web page. The subset of the list of web content results has highest relevance. A remaining list of web content results is displayed without the corresponding click counts in subsequent web pages.

In some embodiments, the list of web content results along with the plurality of click counts is displayed in one window.

In other embodiments, the list of web content results is displayed in a first window, and the list of web content results along with the plurality of click counts is displayed in a second window.

In some embodiments, the list of web content results is displayed in a separate extensible markup language (XML) element or as a separate data element in hypertext markup language (HTML).

In one example, a user enters a search query in Yahoo!® Search. The user can continue searching using the search query or can choose another search query from a list of similar search queries. The list of similar search queries includes search queries that were previously entered by one or more contacts from a social network, for example Yahoo!® network, of the user. A list of web content results along with a plurality of click counts is displayed to the user. The list of web content results can be ranked such that web content results with higher click counts are placed first. Each click count is generated by the one or more contacts in the social network of the user and is displayed with the corresponding web content result in the list of web content results. The user can then select a web content result, from the list of web content results, based on an associated click count. The web content result can be one of a search result, a search suggestion, a link or an advertisement.

The method can be performed online using a web browser, or offline using application programming interface (API) calls.

The present disclosure improves relevance of web content and relevance of search queries by integrating information associated with click count, contacts from a social network of a user, the search queries, and a search algorithm. Web content results are hence not based on demographical differences. By displaying a click count along with a web content result, relevance of the web content is higher as the one or more contacts from the social network of the user have previously selected the web content result. Hence, the user is more likely to select such a web content result which in turn has a positive impact on revenue from the information associated with the click count.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method comprising:
   receiving, at a computing device, a search query from a user;
   generating, via the computing device, a list of web content results based on the search query;
   determining, via the computing device, a plurality of click counts for the list of web content results, each click count of the plurality of click counts associated with one or more contacts in a social network of the user, wherein demographic similarity and a higher click count indicate a higher relevance of a result of the search query;
   mapping, via the computing device, each click count to a corresponding web content result in the list of web content results;
   communicating the list of web content results along with the plurality of click counts, each click count of the plurality of click counts communicated with the corresponding web content result in the list of web content results, said communication comprising facilitating display of the list of web content results along with the plurality of click counts; and
   providing, via the computing device, a second plurality of search queries to the user, the second plurality of search queries being similar to the search query from the user, each of the second plurality of search queries having been previously entered by the one or more contacts from the social network of the user.

2. The method of claim 1, wherein the list of web content results along with the plurality of click counts is displayed in one window.

3. The method of claim 1 further comprising:
   facilitating displaying the list of web content results in a first window; and
   facilitating displaying the list of web content results along with the plurality of click counts in a second window.

4. The method of claim 1, wherein providing the second plurality of search queries comprises:
   mining the second plurality of search queries from a first plurality of search queries.

5. The method of claim 4, wherein the first plurality of search queries are created by the one or more contacts in the social network of the user.

6. The method of claim 1, wherein generating the list of web content results comprises:
   ranking the list of web content results using a search algorithm.

7. The method of claim 1, wherein the list of web content results comprises one or more of search results, search suggestions, links and advertisements.

8. A non-transitory computer-readable storage medium tangibly encoded with a computer program product that when executed by a processor, performs a method comprising:
   receiving a search query from a user;
   generating a list of web content results based on the search query;
   determining a plurality of click counts for the list of web content results, each click count of the plurality of click counts being generated by one or more contacts in a social network of the user, wherein demographic similarity and a higher click count indicate a higher relevance of a result of the search query;
   mapping each click count to a corresponding web content result in the list of web content results;
   communicating the list of web content results along with the plurality of click counts, each click count of the plurality of click counts communicated with the corresponding web content result in the list of web content results, said communication comprising facilitating display of the list of web content results along with the plurality of click counts; and
   providing a second plurality of search queries to the user, the second plurality of search queries being similar to the search query from the user, each of the second plurality of search queries having been previously entered by the one or more contacts from the social network of the user.

9. The non-transitory computer-readable storage medium of claim 8, wherein the list of web content results along with the plurality of click counts is displayed in one window.

10. The non-transitory computer-readable storage medium of claim 8 further comprising:
    facilitating displaying the list of web content results in a first window; and
    facilitating displaying the list of web content results along with the plurality of click counts in a second window.

11. The non-transitory computer-readable storage medium of claim 8, wherein providing the second plurality of search queries comprises:
    mining the second plurality of search queries from a first plurality of search queries.

12. The non-transitory computer-readable storage medium of claim 11, wherein the first plurality of search queries is created by the one or more contacts in the social network of the user.

13. The non-transitory computer-readable storage medium of claim 8, wherein generating the list of web content results comprises:
    ranking the list of web content results using a search algorithm.

14. The non-transitory computer-readable storage medium of claim 8, wherein the list of web content results comprises one or more of search results, search suggestions, links and advertisements.

15. A system comprising:
    one or more electronic devices;

a communication interface in electronic communication with the one or more electronic devices;
a memory that stores instructions; and
a processor responsive to the instructions to:
  receive a search query from a user;
  generating a list of web content results based on the search query;
  determine a plurality of click counts for the list of web content results, each click count of the plurality of click counts being generated by one or more contacts in a social network of the user, wherein demographic similarity and a higher click count indicate a higher relevance of a result of the search query;
  map each click count to a corresponding web content result in the list of web content results;
  communicate the list of web content results along with the plurality of click counts, each click count of the plurality of click counts communicated with the corresponding web content result in the list of web content results, said communication comprising facilitating display of the list of web content results along with the plurality of click counts; and
  provide a second plurality of search queries to the user, the second plurality of search queries being similar to the search query from the user, each of the second plurality of search queries having been previously entered by the one or more contacts from the social network of the user.

16. The system of claim 15 further comprising:
an electronic storage device that stores the list of web content results, a first plurality of search queries, and a second plurality of search queries.

17. The system of claim 16, wherein the processor is further responsive to the instructions to:
  mine the second plurality of search queries from the first plurality of search queries; and
  provide the second plurality of search queries to the user.

18. The system of claim 17, wherein the first plurality of search queries is created by the one or more contacts in the social network of the user.

* * * * *